United States Patent [19]

Ishikawa

[11] Patent Number: 5,247,286
[45] Date of Patent: Sep. 21, 1993

[54] DISPLAY CONTROL DEVICE FOR REDUCING POWER CONSUMPTION OF DISPLAY UNITS

[75] Inventor: Yasuo Ishikawa, Kanagawa, Japan

[73] Assignee: Mitsubishi Denki Kabushiki Kaisha, Tokyo, Japan

[21] Appl. No.: 689,470

[22] Filed: Apr. 22, 1991

[30] Foreign Application Priority Data

May 7, 1990 [JP] Japan ................. 2-117248

[51] Int. Cl.⁵ .............................. G09G 1/00
[52] U.S. Cl. ............................ 345/3; 345/102; 345/211; 345/10
[58] Field of Search ............ 340/784 G, 811, 720; 364/707; 359/48, 49, 50; 358/220

[56] References Cited

U.S. PATENT DOCUMENTS

| | | | |
|---|---|---|---|
| 4,868,563 | 9/1989 | Stair et al. | 340/765 |
| 4,958,915 | 9/1990 | Okada et al. | 340/784 G |
| 5,021,983 | 6/1991 | Nguyen et al. | 364/707 |
| 5,059,961 | 10/1991 | Cheng | 340/720 |
| 5,065,357 | 11/1991 | Shiraishi et al. | 364/707 |

FOREIGN PATENT DOCUMENTS

| | | | |
|---|---|---|---|
| 0175935 | 4/1986 | European Pat. Off. | |
| 0265209 | 4/1988 | European Pat. Off. | |
| 0364222 | 4/1990 | European Pat. Off. | |
| 112371 | 6/1984 | Japan | |
| 9634 | 1/1986 | Japan | |
| 0105112 | 4/1990 | Japan | 359/48 |
| 2-105112 | 4/1990 | Japan | |

OTHER PUBLICATIONS

IBM Personal System/2 Hardware Interface Technical Reference.

Primary Examiner—Alvin E. Oberley
Assistant Examiner—Gin Goon
Attorney, Agent, or Firm—Wolf, Greenfield & Sacks

[57] ABSTRACT

A display control device for receiving input data at a display controller-kernel unit, storing it in a memory, sequentially reading the stored data from the memory and displaying it on a display unit. The control device comprises a counter which is reset when a signal indicating writing of data in the memory is detected to output a counter signal when a predetermined value is counted, a display control circuit for outputting a control signal so as to close a gate inserted in a signal line between the display controller-kernel unit and the display unit in response to the counter signal to interrupt the signal line and turn off the backlight of the display unit, and means for invalidating the control signal when the fact that a signal is written in the memory is detected.

11 Claims, 2 Drawing Sheets

DISPLAY CONTROL DEVICE FOR REDUCING POWER CONSUMPTION OF DISPLAY UNITS

BACKGROUND OF THE INVENTION

1. Field of the Invention

This invention relates to a display control device where in order to reduce power consumption, input data is stored to be sequentially displayed on a display screen and, particularly, to a display control device adapted to turn off a display unit as long as no change in a displayed content takes place.

2. Prior Art

A display control device is well known in which input data is stored in a memory and displayed sequentially on a screen. In such a display control device, a display controller-kernel unit delivers a control signal to a display panel, such as a liquid crystal display (LCD) panel or the like, in accordance with control instructions from an external unit, such as a central processing unit (CPU), to commence the control of the display panel and also stores data (character codes) fed from the CPU in a memory. The stored data are successively read from the memory, converted by the display controller-kernel unit to data to be displayed (character patterns) and fed to the display panel for display.

Since the above-referred display control device reads the content of the memory to cause it to be displayed on the display screen even when no change in displayed content takes place, there is a drawback in that power is consumed even when no data are required to be displayed.

It is well known to turn off a display screen when no data are required to be displayed. For example, Japanese Patent Public Disclosure No. 9634/86 laid open on Jan. 17, 1986 discloses a display control device for causing data to be displayed for a predetermined period of time in response to an operation of an input means. It is, however, necessary in such a prior art device to provide additional software to the control device and change the display controller-kernel unit, which will result in an increase in the size and cost of the device.

Japanese Patent Public Disclosure No. 112371/84 laid open on Jun. 28, 1984 also discloses a technique for automatically turning off a screen when a predetermined period of time for which the same image is displayed has lapsed. This technique also has such problems as mentioned above.

SUMMARY OF THE INVENTION

The present invention has been made to solve such problems. It is an object of the invention to provide a display device capable of reducing a power consumption of a display control device, by adding simple circuits thereto, when no data are required to be displayed.

To attain this purpose, the present invention, in one aspect, provides a display control device for causing input data to be stored in a memory to sequentially read the stored data for causing them to be displayed on a display unit, the device comprising:

timer means for detecting the fact that no data is written in the memory for a predetermined period of time; and control means for disabling the display unit in response to the output of the timer means;

whereby a power consumption of the display unit is reduced.

The timer means may be a counter which is reset in response to the writing of the data in the memory and provides an output signal when the counter has counted up to a value corresponding to the predetermined period of time.

The display control device according to the invention may further comprise gate means disposed in a signal path coupling the memory and the display unit, the control means being operable to close the gate means and disable the display unit in response to the signal output from the counter.

The display unit may be an LCD panel and the control means may be operable to turn off the backlight of the LCD panel.

According to another aspect of the invention, the present invention provides a display control device including a display controller for receiving input data, storing it in a memory, sequentially reading the data stored in the memory and transmitting it to a display unit, the device comprising:

timer means for generating an output at the time when a predetermined period of time has lapsed from the time of the data being written in the memory;

gate means disposed in a signal path coupling the display controller and the display unit; and control means for closing the gate means in response to the output of the timer means to disable the display unit, and for opening the gate means in response to the writing of the data in the memory to enable the display unit.

The display controller and the LCD panel may be connected by a signal line for transmitting a data shift clock as well as by a signal line for transmitting LCD data, and the gate means may be inserted in these signal lines.

According to a further aspect of the invention, the present invention provides a display control device for receiving input data at a display controller-kernel unit, storing it in a memory and sequentially reading the stored data from the memory and displaying it on a display unit, the device comprising:

a counter which is reset when a signal indicating writing of data in the memory is detected to output a counter signal when a predetermined value has been counted;

a display control circuit for outputting a control signal so as to close a gate inserted in a signal line between the display controller-kernel unit and the display unit in response to the counter signal to interrupt the signal line and turn off the backlight of the display unit; and means for invalidating the control signal when the fact that a signal is written in the memory is detected.

The foregoing and other objects and advantages of the invention will become more apparent from the following detailed description with reference to the accompanying drawings.

DETAILED DESCRIPTION OF THE PREFERRED EMBODIMENTS

Figure 1:
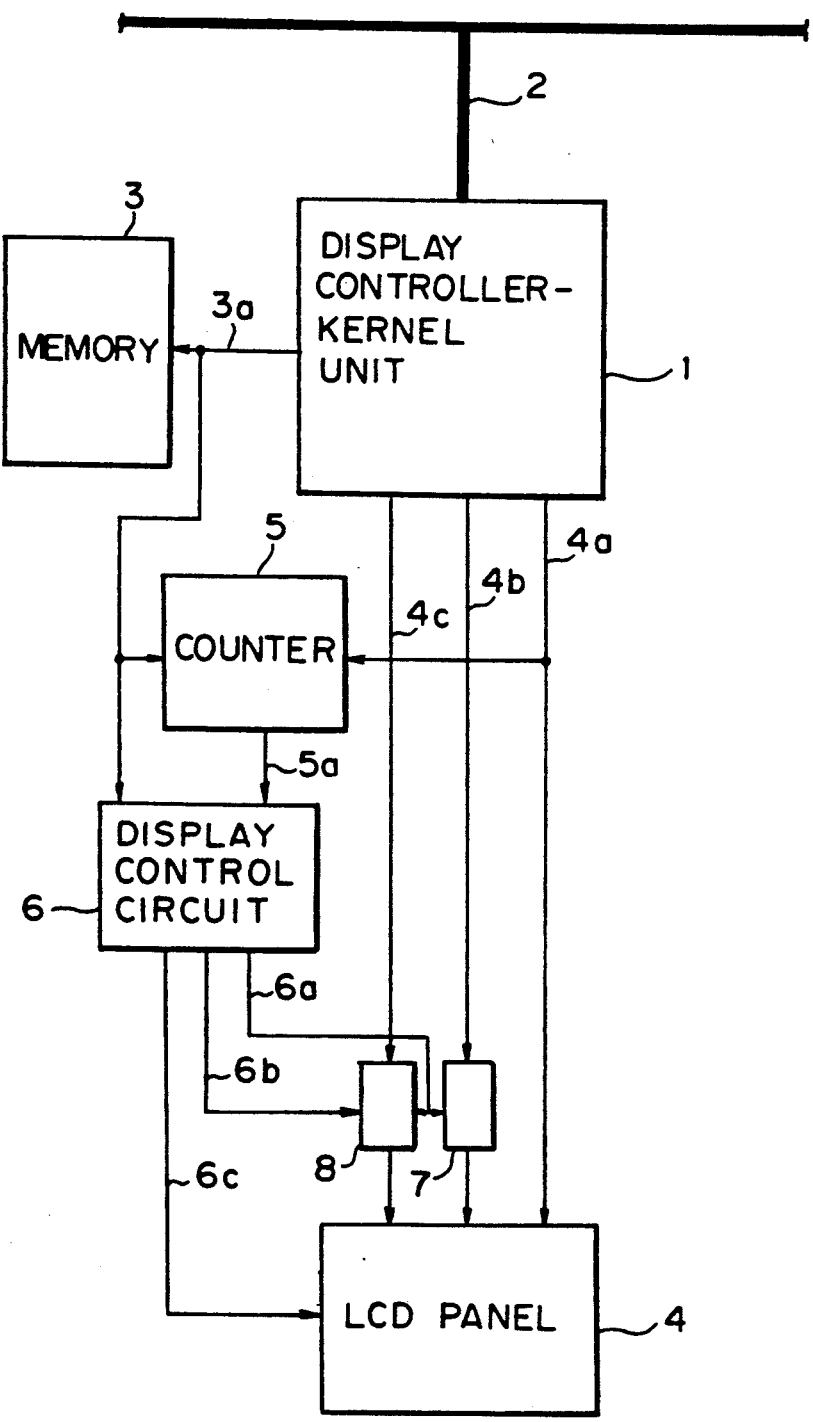
FIG. 1 is a block diagram showing the structure of an embodiment of a display control device in accordance with the present invention.

FIG. 1 is a block diagram showing the structure of an embodiment of a display control device in accordance with the present invention. In the drawing, a display controller-kernel unit 1 is connected to a CPU bus 2 which transmit a control signal from a CPU (not shown). The display controller-kernel unit 1 is also connected through a memory bus 3a to a memory 3 and delivers a control signal to a control signal line 4a, a data shift clock to a clock line 4b and a display data to a data line 4c. The display controller-kernel unit 1 is further connected through the signal line 4a to an LCD panel 4.

The memory bus 3a is connected to a reset terminal of an internal counter 5, and the control signal line 4a is connected to a count terminal of the internal counter 5. The counter signal or output of the internal counter 5 is output to a signal line 5a.

The internal counter 5 is connected through the signal line 5a to a display control circuit 6. The display control circuit 6 delivers a clock control signal to a signal line 6a, a data control signal to a signal line 6b and a backlight control signal to a signal line 6c.

A clock gate 7 and a data gate 8 are disposed in the signal path 4b and 4c, respectively, connecting between the display controller-kernel unit 1 and the LCD panel 4, the signal line 6a being connected to both of the gates, the signal line 6b to the data gate 8 and the signal line 6c to the LCD panel 4.

In operation, when control instructions are fed from the CPU through the CPU bus 2 to the display controller-kernel unit 1, it delivers the LCD control signal through the signal line 4a to the LCD panel 4 and commences the control of the LCD panel 4.

The display controller-kernel unit 1 produces a memory control signal for controlling the memory 3 and a data shift clock pulse for storing the data (character codes) fed through the CPU bus 2 in the memory 3. The data stored in the memory 3 are sequentially read, converted to display data (character patterns) and output to the LCD display data line 4c.

Figure 2:
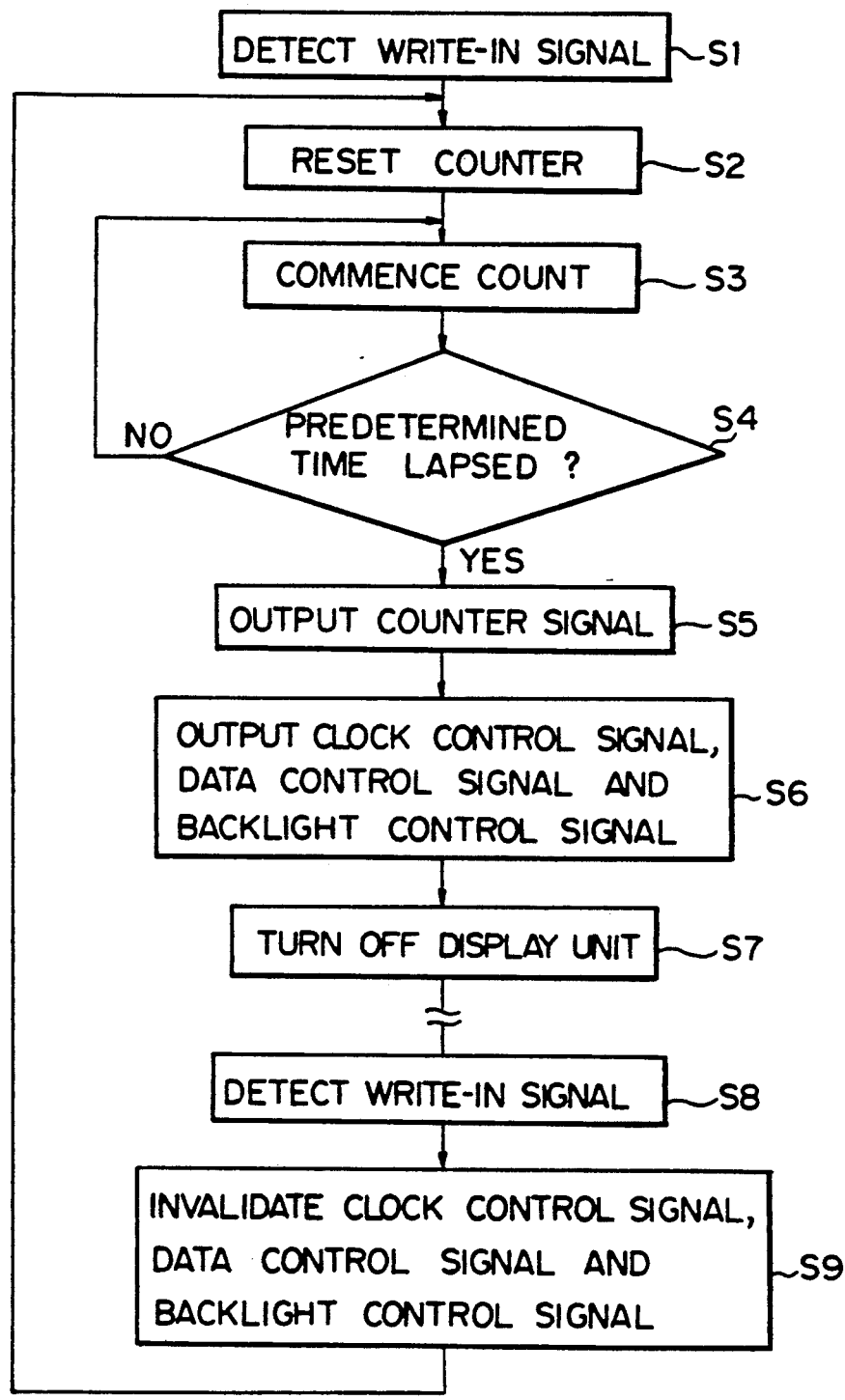
FIG. 2 is a flow chart for explaining an operation of the display control device of FIG. 1.

The internal counter 5, when it detects the fact that a write-in signal has been output to the memory bus 3a, clears its count values and receives the LCD control signal from the signal line 4a to commence a counting operation (Steps S1-S3 of FIG. 2). Simultaneously, the display control circuit 6 operates to open the clock gate 7 and the data gate 8 by the clock control signal and the data control signal, whereby the display data fed through the data line 4c is updated by the clock pulse supplied through the LCD data shift clock line 4b and displayed on the LCD display panel 4.

If no write-in signal is detected on the memory bus 3a while a predetermined value has been counted and a predetermined period of time has lapsed, a counter signal is delivered to the counter signal line 5a (Steps S4-S5).

When detecting the counter signal on the signal line 5a, the display control circuit 6 delivers the clock control signal, the data control signal and the backlight control signal to the signal lines 6a, 6b and 6c, respectively, so that the clock gate 7 and the data gate 8 are closed by the clock control signal and the data control signal and the backlight of the LCD panel 4 is switched off, thus causing the display of the LCD panel 4 to be turned off (Steps S6-S7).

When a write-in signal is output again to the memory bus 3a while the display is being turned off, the display control circuit 6 operates to cancel all of the clock control signal, data control signal and backlight control signal which have been output up to this time (Steps S8-S9), and the display is recovered on the LCD panel 4.

In this manner, this embodiment operates to turn off the display unit after a predetermined lapse of time defined by the counter 5, in the event that no change in display content takes place, and thus power consumption is reduced when no data are required to be display.

Although the present invention has been described in detail with reference to a preferred embodiment, various modifications and alternations can be effected without departing from the scope and spirit of the invention. In stead of the LCD panel, for example, a CRT, plasma display or the like can be used as a display unit.

What is claimed is:

1. A display control device for receiving input data at a display controller-kernel unit, storing it in a memory, sequentially reading the stored data from the memory and displaying it on an LCD panel, said control device comprising:
   means for asserting a reset signal when data is written to the memory;
   timer means for asserting a timer signal when a predetermined period of time has elapsed since the assertion of the reset signal, said timer means deasserting the timer signal when the reset signal is asserted;
   first and second logic gates respectively disposed in first and second signal paths between said display controller-kernel unit and the LCD panel, the first signal path for transmitting LCD data between said display controller-kernel unit and the LCD panel, the second signal path for transmitting a data shift clock between said display controller-kernel unit and the LCD panel;
   a display control circuit for generating at least one control signal, the control signal being coupled to said first and second logic gates for disabling said first and second logic gates when the control signal is asserted, the control signal being further coupled to the LCD panel for disabling the backlight of the LCD panel when the control signal is asserted, said display control circuit including means for asserting the control signal in response to the assertion of the timer signal, said display control circuit including means for deasserting the control signal when the reset signal is asserted.

2. A display control device as set forth in claim 1, wherein said timer means is a counter which is reset in response to the assertion of the reset signal and asserts the timer signal when said counter has counted up to a value corresponding to the predetermined period of time.

3. A display control device as set forth in claim 1, wherein said display control circuit generates first, second and third control signals, the first control signal being coupled to said first logic gate for disabling said first logic gate when the first control signal is asserted, the second control signal being coupled to said second logic gate for disabling said second logic gate when the second control signal is asserted, the third control signal being coupled to the LCD panel for disabling the backlight of the LCD panel when the third control signal is asserted.

4. A display control device as set forth in claim 3, wherein the second control signal is further coupled to said first logic gate for disabling said first logic gate when the second control signal is asserted.

5. A display control device for receiving input data at a display controller-kernel unit, storing it in a memory, sequentially reading the stored data from the memory and displaying it on an LCD panel, said control device comprising:

means for asserting a reset signal when data is written to the memory;

timer means for asserting a timer signal when a predetermined period of time has elapsed since the assertion of the reset signal, said timer means deasserting the timer signal when the reset signal is asserted;

first and second signal paths coupled between said display controller-kernel unit and the LCD panel, the first signal path for transmitting LCD data between said display controller-kernel unit and the LCD panel, the second signal path for transmitting a data shift clock between said display controller-kernel unit and the LCD panel;

first and second logic gates respectively disposed in said first and second signal paths;

a display control circuit for generating first, second and third control signals, the first control signal being coupled to said first logic gate for disabling said first logic gate when the first control signal is asserted, the second control signal being coupled to said second logic gate for disabling said second logic gate when the second control signal is asserted, the third control signal being coupled to the LCD panel for disabling the backlight of the LCD panel when the third control signal is asserted, said display control circuit including means for asserting the first, second and third control signals in response to the assertion of the timer signal, said display control circuit including means for deasserting the first, second and third control signals when the reset signal is asserted.

6. A display control device as set forth in claim 5, wherein said timer means is a counter which is reset in response to the assertion of the reset signal and asserts the timer signal when said counter has counted up to a value corresponding to the predetermined period of time.

7. A display control device as set forth in claim 5, wherein the second control signal is further coupled to said first logic gate for disabling said first logic gate when the second control signal is asserted.

8. A display system comprising:
a memory for storing data;
an LCD panel;
a display controller-kernel unit coupled to said memory and said LCD panel, said display controller-kernel unit including means for receiving input data and means for writing received input data to said memory, said display controller-kernel unit further including means for sequentially reading stored data from the memory and displaying it on the LCD panel;

means for asserting a reset signal when data is written to the memory;

timer means for asserting a timer signal when a predetermined period of time has elapsed since the assertion of the reset signal, said timer means deasserting the timer signal when the reset signal is asserted;

first and second signal paths coupled between said display controller-kernel unit and said LCD panel, the first signal path for transmitting LCD data between said display controller-kernel unit and said LCD panel, the second signal path for transmitting a data shift clock between said display controller-kernel unit and said LCD panel;

first and second logic gates respectively disposed in said first and second signal paths;

a display control circuit for generating at least one control signal, the control signal being coupled to said first and second logic gates for disabling said first and second logic gates when the control signal is asserted, the control signal being further coupled to said LCD panel for disabling the backlight of said LCD panel when the control signal is asserted, said display control circuit including means for asserting the control signal in response to the assertion of the timer signal, said display control circuit including means for deasserting the control signal when the reset signal is asserted.

9. A display control device as set forth in claim 8, wherein said timer means is a counter which is reset in response to the assertion of the reset signal and asserts the timer signal when said counter has counted up to a value corresponding to the predetermined period of time.

10. A display control device as set forth in claim 8, wherein said display control circuit generates first, second and third control signals, the first control signal being coupled to said first logic gate for disabling said first logic gate when the first control signal is asserted, the second control signal being coupled to said second logic gate for disabling said second logic gate when the second control signal is asserted, the third control signal being coupled to said LCD panel for disabling the backlight of said LCD panel when the third control signal is asserted.

11. A display control device as set forth in claim 10, wherein the second control signal is further coupled to said first logic gate for disabling said first logic gate when the second control signal is asserted.

* * * * *